United States Patent
Hardisty

(10) Patent No.: US 7,327,719 B2
(45) Date of Patent: Feb. 5, 2008

(54) MANAGING INTERNET PROTOCOL UNICAST AND MULTICAST COMMUNICATIONS

(75) Inventor: Timothy Hardisty, Salisbury (GB)

(73) Assignee: Trilogy Communications Limited, Andover, Hampshire (GB)

( * ) Notice: Subject to any disclaimer, the term of this patent is extended or adjusted under 35 U.S.C. 154(b) by 1070 days.

(21) Appl. No.: 10/113,493

(22) Filed: Mar. 29, 2002

(65) Prior Publication Data

US 2002/0141394 A1 Oct. 3, 2002

(30) Foreign Application Priority Data

Apr. 3, 2001 (GB) .................. 0108362.5

(51) Int. Cl.
H04L 12/66 (2006.01)
H04L 12/28 (2006.01)
H04L 12/16 (2006.01)
H04M 11/00 (2006.01)

(52) U.S. Cl. .............. 370/352; 370/389; 370/260; 379/93.08; 379/93.21

(58) Field of Classification Search ........... 370/260, 370/261, 262, 264, 270, 352, 389, 390, 493; 379/93.04, 93.08, 93.21, 142.05, 212.01
See application file for complete search history.

(56) References Cited

U.S. PATENT DOCUMENTS

| | | | | |
|---|---|---|---|---|
| 5,539,741 A | * | 7/1996 | Barraclough et al. | ....... 370/267 |
| 5,930,238 A | * | 7/1999 | Nguyen | ....... 370/260 |
| 5,983,192 A | * | 11/1999 | Botzko et al. | ....... 704/500 |
| 6,167,060 A | | 12/2000 | Vargo | |
| 6,240,070 B1 | | 5/2001 | Kozdon et al. | |
| 6,452,924 B1 | * | 9/2002 | Golden et al. | ....... 370/352 |
| 6,628,340 B1 | * | 9/2003 | Graczyk et al. | ....... 348/552 |
| 6,763,275 B2 | * | 7/2004 | Naruki et al. | ....... 700/94 |
| 6,931,134 B1 | * | 8/2005 | Waller et al. | ....... 381/27 |
| 7,006,455 B1 | * | 2/2006 | Fandrianto et al. | ....... 370/260 |
| 7,031,326 B1 | * | 4/2006 | Shur et al. | ....... 370/401 |
| 7,197,150 B2 | * | 3/2007 | Hori | ....... 381/119 |

FOREIGN PATENT DOCUMENTS

WO WO 00/57620 A1 9/2000

* cited by examiner

*Primary Examiner*—Hanh Nguyen
(74) *Attorney, Agent, or Firm*—Seyfarth Shaw LLP

(57) ABSTRACT

A system for managing internet protocol of at least unicast and/or multicast communications over a network has a network interface 20 for interfacing between the network 10 and other parts of the system. An audio compression/decompression and packetising controller 30 is interposed between the interface 20 and an audio mixer 40 such that the network interface outputs audio signals to the audio mixer for mixing the audio signals at different respective audio levels. An audio channel manager is connected to the controller 30 and audio mixer 40 so as to dynamically allocate audio channels and for connecting the audio mixer to an allocated channel. A message manager 60 is connected to the network interface and to the audio channel manager for managing the unicast and/or multicast communication of the audio signals.

17 Claims, 4 Drawing Sheets

MANAGING INTERNET PROTOCOL UNICAST AND MULTICAST COMMUNICATIONS

BACKGROUND OF THE INVENTION

1) Field of the Invention

This invention relates to a system and method for managing Internet Protocol unicast and multicast communications.

2) Description of the Related Art

Presently, systems exist to provide one-to-one, one-to-many and many-to-one communications in a form often known as intercom, talkback or conferencing. Such systems generally use vendor-specific interconnections and dedicated hardware and/or software. These provide telephony-based multi-user "conferencing" and are available on commercially available analogue or digital telephony systems as well as Internet Protocol (IP) based systems, commonly known as Voice-over-IP, or VoIP. All these known systems can provide communications between single and multiple users.

IP-based systems presently rely on "call conferencing". That is, to set up a conference, a conference initiator utilises functions of the telephone or telephone application to call up the parties required. Each participant, or conference member, connects to the conference using a telephone line or channel. At all times the members of the conference are determined and controlled by the conference initiator who exclusively has the executive power to terminate the conference. Individual participants may leave at any time, but they cannot then rejoin without intervention from the conference initiator.

In order that each conference member may hear other conference members, the audio received from all participants is mixed together at the initiator's telephone/system and re-transmitted to the conference members. This has the disadvantage that all members receive audio at a fixed level controlled by the initiator's telephone/system. Additionally each member receives his own audio back again from the conference initiator and then relies on the abilities of an echo canceller or other "ducking" and/or dimming techniques to reduce this to an acceptable level. Dimming is a technique whereby gain of an audio route is temporarily reduced to prevent howl-round.

Typical telephony and/or computer audio inputs also have poor control over audio input levels allowing overload conditions to exist. In an attempt to prevent this, lower than ideal operating levels may be used to leave high overload margins and therefore the system runs with an increased noise floor.

In this way, the audio quality of the conference is compromised.

Moreover, the transmission of audio over an IP network using VoIP technology is generally undertaken using unicast, i.e. one-to-one, messaging. As the number of conference members increases, the network traffic thereby necessarily increases.

SUMMARY OF THE INVENTION

There is, therefore, a requirement to provide communications for, but not exclusively for, intercom and conferencing based on IP technology which provides the ability to mix a number of audio channels together to provide a user with received audio from a number of different sources.

Such a system should desirably provide better control of the audio mixing and distribution functions in certain IP audio applications, with better overload control. Preferably each user should be provided with independent control over received and transmitted audio channels, and their audio levels, so that mixing thereby becomes "distributed" between all participants. To reduce network loading, audio should be distributed between the participants using either unicast or multicast, i.e. one-to-many, addressing as appropriate to ensure minimal network traffic.

This invention seeks to overcome the foregoing difficulties and achieve the above objects.

According to a first aspect of the invention there is provided a system for managing Internet Protocol of at least one of unicast and multicast communications over a network, the system comprising: network interface means for interfacing between the network and other parts of the system; signal processing means connected to the network interface means having at least one audio channel for decompressing and de-packetising audio signals received from the network through the network interface means and for outputting the audio signals to audio mixer means for mixing the audio signals at different respective audio levels and having at least one audio channel for compressing and packetising audio signals received from the audio mixer means mixed at different respective audio levels for transmission through the network interface means over the network; audio channel manager means connected to the signal processing means for dynamically allocating the audio channels in the signal processing means and connected to the audio mixing means for signalling an allocated channel to the audio mixing means; and message manager means connected to the network interface means and to the audio channel manager means for managing the at least one of unicast and multicast communication of the audio signals.

Conveniently, there is provided system controller means connected to the message manager means and the audio channel manager means for configuring and controlling the message manager means and the audio channel manager means.

Preferably, there is provided application program interface means connected to the system controller means for interfacing between the system controller means and an application program.

Conveniently, there is provided audio input and output interface means for interfacing between the audio mixer means and audio inputs and outputs.

Advantageously, the audio input and output interface means comprise at least one of audio limiting and compression means.

Advantageously, the message manager means includes means for determining which remote systems may join and leave a communication session thereby preventing unauthorised monitoring of or contributions to the communication session.

According to a second aspect of the invention there is provided a method for managing Internet Protocol transmission of at least one of unicast and multicast communications over a network to a remote system, comprising the steps of: a) receiving an audio transmission request at audio channel manager means to transmit an audio signal over the network to a remote location; b) the audio channel manager means communicating with signal processing means to determine whether an appropriate audio compression and packetisation channel is allocated within the signal processing means and if not establishing such a channel and instructing an audio mixer connected to the signal processing means thereof; c)

message manager means connected to the audio channel manager means determining whether a multicast session is established with the remote system and if it is established adding the address of the remote system to an address list of the multicast session but if it is not established determining whether to establish a multicast session or a unicast session as appropriate with the remote location and establishing a new multicast session and adding the address of the remote location to an address list of the new multicast session or establishing a unicast session as determined; d) using the signal processing means to compress and packetise the audio signal; and e) transmitting the compressed and packetised audio signal over the network to the remote system.

Conveniently, step a) of receiving an audio request at audio manager means includes the steps of providing system controller means connected to the message manager means and to the audio channel manager means and providing an application program interface between the system controller and an application program, and receiving the audio transmission request at the application program interface and passing the request through the system controller means to the audio channel manager means.

Advantageously, step d) of using the signal processing means to compress and packetise the audio signal further comprises the steps of providing audio input and output means connected to the audio mixing means and receiving an audio signal at the audio input and output means, limiting and/or compressing the audio signal and passing the signal to the audio mixing means for mixing the audio signal with other audio signals and passing the mixed audio signals to the signal processing means.

Conveniently, step e) of transmitting the compressed and packetised audio signal, further comprises the steps of passing a compressed and packetised audio signal from the signal processing means to an IP interface means for transmission over the network.

Advantageously, the method includes the further step, after receipt of the audio transmission request, of determining whether communication with the remote system is permitted according to predetermined rules and either allowing or aborting the audio transmission request accordingly.

According to a third aspect of the invention there is provided a method for managing the reception of at least one of unicast and multicast communications over a network, comprising the steps of: a) receiving an audio reception request at audio channel manager means to receive an audio signal over the network from a remote system; b) the audio channel manager means communicating with signal processing means to determine whether an appropriate audio de-compression and de-packetisation channel is allocated within the signal processing means and if not establishing such a channel; c) the audio channel manager means instructing an audio mixer of the allocated channel; d) receiving the audio signal at the signal processing means; e) the signal processing means decompressing and depacketising the received audio signal in the allocated channel and outputting the decompressed and de-packetised audio signal to the audio mixing means; and f) the audio mixing means mixing the received signal with other received audio signals and outputting the mixed audio signals to audio outputs connected to the audio mixing means.

Conveniently, the step of receiving an audio reception request at audio manager means comprises the further steps of receiving an audio reception request over the network at IP interface means, passing the request to the message manager means and the message manager means passing the request to the audio channel manager means.

Advantageously, step d) of receiving the audio signal comprises receiving the audio signal at the IP interface means and passing the audio signal to the audio signal processing means.

Conveniently, there is provided a further step of providing system controller means for controlling the message manager means and for controlling the audio channel manager means, the system controller means interfacing with an application program through application program interface means connected to the system controller means.

Conveniently, there is provided a further step, after receipt of the audio reception request, of determining whether communication with the remote system is permitted according to predetermined rules and either allowing or aborting the audio reception request accordingly.

BRIEF DESCRIPTION OF THE DRAWINGS

An embodiment of the invention will now be described by way of example, with reference to the accompanying drawings in which.

In the figures like reference numerals denote like parts.

DESCRIPTION OF THE PREFERRED EMBODIMENTS

Figure 1:
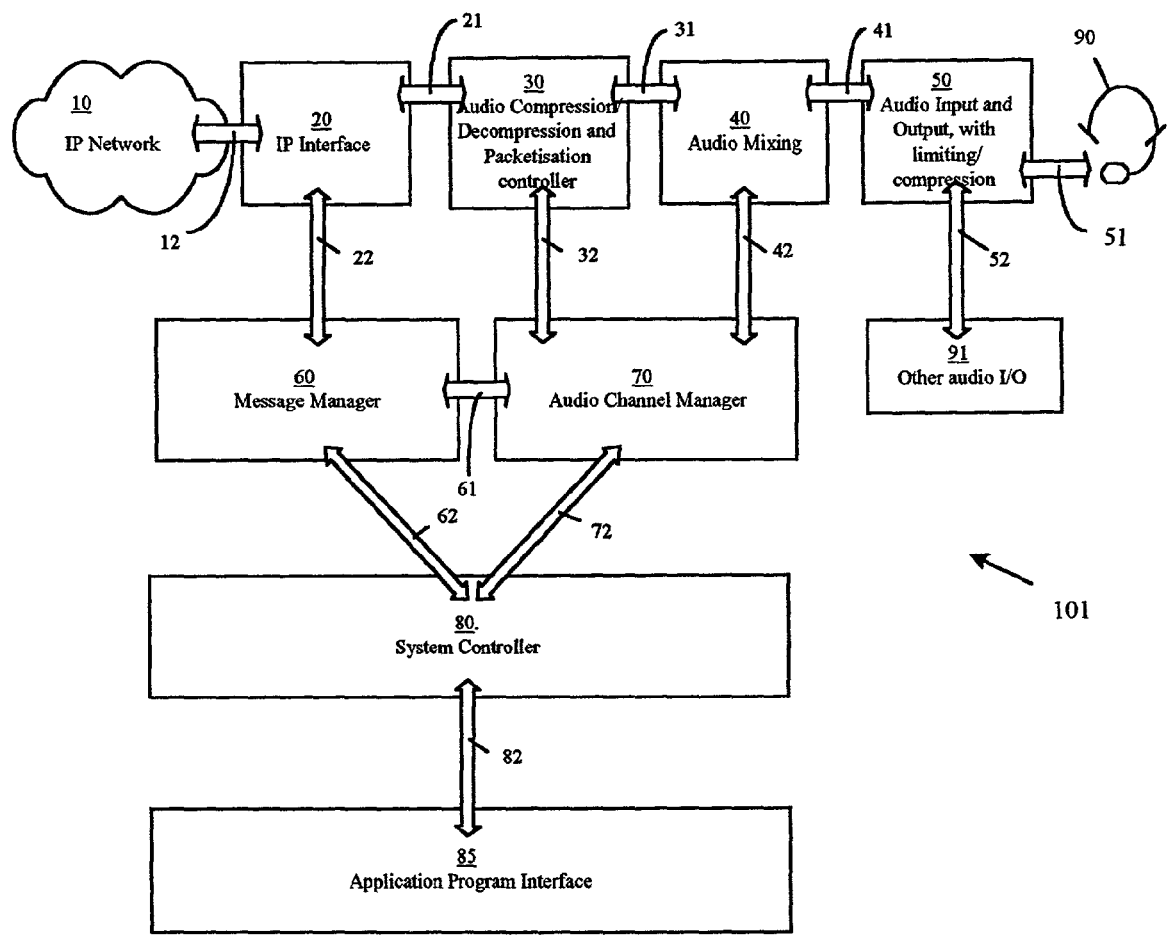
FIG. 1 is a block diagram of a system according to the present invention.

Referring to FIG. 1, a system 101 for managing Internet Protocol unicast and multicast communications includes an internet protocol (IP) interface 20 for connecting other parts of the management system 101 to an IP network 10 by means of a link 12. This interface may include, for example, an ethernet, optical fibre or ATM physical interface and also IP stacks. The IP interface is connected by a link 21 to a signal processing module 30 for audio compression/decompression and packetisation/de-packetisation. The signal processing module provides a choice of channels corresponding to different compression algorithms, e.g. ITU Recommendations G.711, G.722, G.728 and different audio packetisation, for example, RTP: Real-time Transport Protocol, UDP: User Datagram Protocol and AAL: Asynchronous Transfer Mode Adaption Layer. The signal processing module is connected by a link 31 to an audio mixing module 40 providing flexible audio mixing and routing functions whereby 1 . . . n inputs can be mixed and routed to 1 . . . m outputs with fully variable individual gain values as set via the Application Program Interface (API). The audio mixing module 40 is further connected by a link 41 to an audio input/output module 50 which typically provides analogue to digital and digital to analogue conversion, audio filtering and input level limiting/compression. Input and output to the audio input and output module is provided by a link 51 to a microphone and earphones 90 and by a link 52 to other audio input/outputs 91. The IP interface 20 is further connected by a link 22 to a message manager module. The signal processor module 30 and the audio mixer module 40 are connected to an audio channel manager module 70 by links 32 and 42 respectively. The audio channel manager module 70 is also linked to the message manager module 60 by means of a link 61. A system control module 80 is provided for controlling the message manager module and the audio channel manager module by means of links 62 and 72 respectively. The system control module is itself controlled by an application program interface (API) linked to the system controller module by a link 82.

Figure 2:
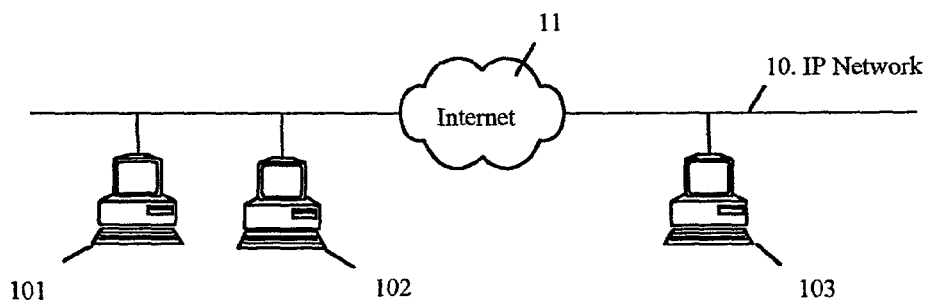
FIG. 2 is an exemplary interconnection diagram illustrating three of the systems shown in FIG. 1 interconnected by an IP network.

FIG. 2 shows a first, second and third systems 101, 102 and 103 interconnected on the IP network 10. As shown in FIG. 2, the systems may be connected via the Internet 11 if required. It is to be understood that the present invention can be utilised to establish communications between numerous further users, or systems, not shown in the Figure. The interconnection technology is not prescribed; the requirement on the network is the ability to convey IP data packets for unicast and/or multicast sessions. FIG. 2 illustrates an embodiment of the invention using three Personal Computers (PCs). It is to be understood that the present invention may have numerous other embodiments, not described in detail, such as:

non-PC hosted standalone embedded systems
pure hardware (utilising electronic components)
software-only systems running on a PC or dedicated computing hardware.

The application program interface 85 is used to configure the system, providing information relating at least to an IP address of the system and multicast address ranges. Additionally, security-related information and the IP address of other users that each system may communicate with, and the manner in which they may communicate with each other (i.e. "rules") are required. Such information is application-specific and not the subject of this invention. It is assumed, for the purposes of this description, that such configuration has been carried out and that all three exemplary systems 101, 102, 103 shown in FIG. 2 may freely communicate, and have a method for establishing such communication.

The method of operation of the invention will now be described.

First System 101 Initiates Audio Transmission to Second System 102

Figure 3:
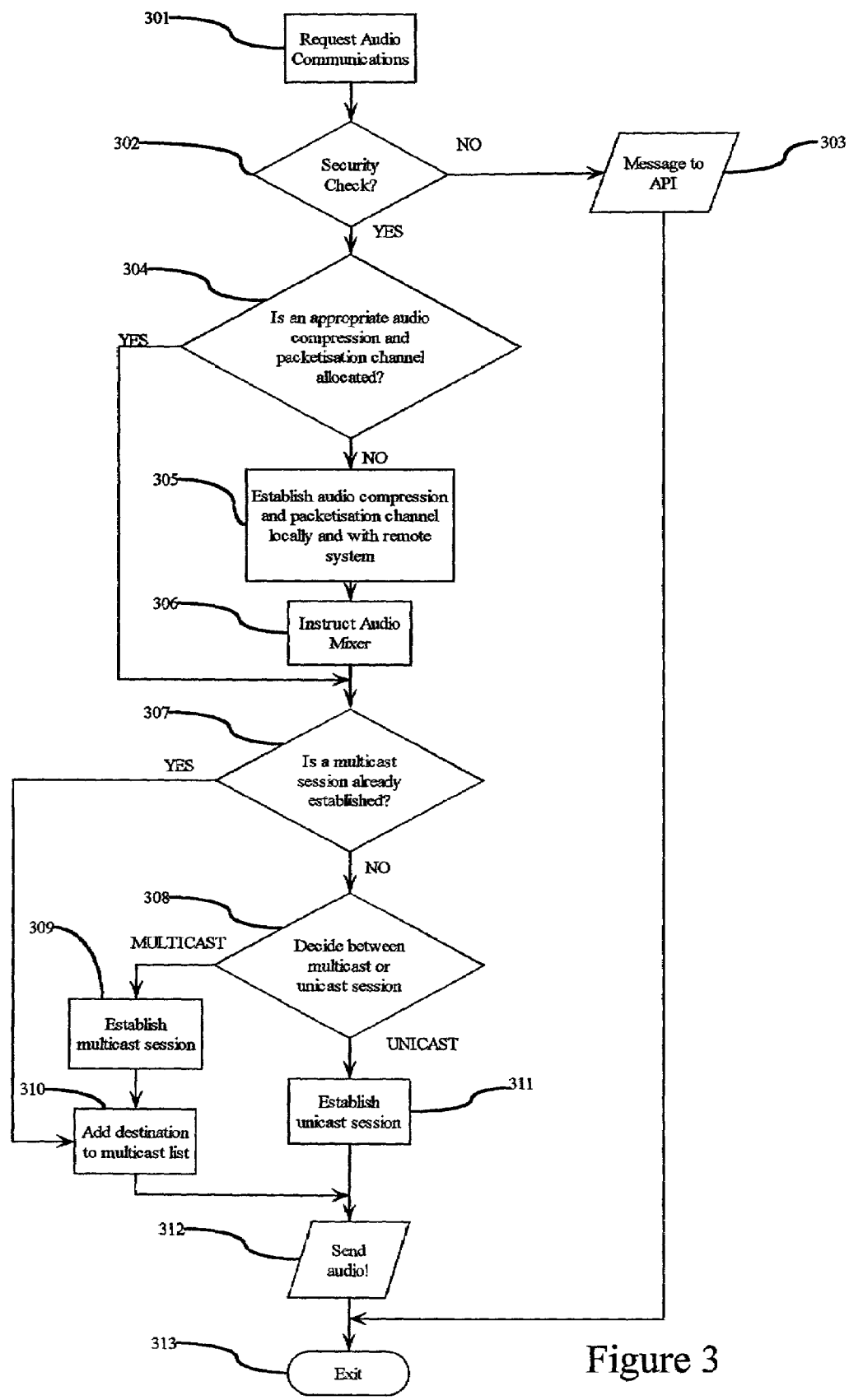
FIG. 3 is a flowchart of the method of initiating audio communications according to an aspect of the invention.

Referring to FIG. 3, together with FIGS. 1 and 2, in order for the first system 101 to initiate a request for audio communication with the second system 102 through the API 85, a request for audio transmission is made, step 301. Security and authentication checks are carried out, step 302, by the message manager 60 exchanging unicast messages, using standard protocols, such as TCP/IP between the first system 101 and the second system 102 to verify that security rules imposed by the controlling application through the API, allow this communication to take place. If such checks fail, a message is sent, step 303, via the API to the user, or the user application program. Once verified that communication can take place, the system controller 80 determines, step 304, through the audio channel manager 70, whether a corresponding audio compression and packetisation channel is allocated in the signal processing unit 30. If the audio channel manager ascertains that no channel is allocated, the audio channel manager will allocate, step 305, a compression and packetisation channel in the signal processor module 30 and instruct, step 306, the audio mixer 40 appropriately. A number of different compression channels may be available in the signal processor module 30 according to application requirements, each offering different selectable compression algorithms and packetisation encapsulations. The initial negotiation with the remote second system 102 may determine the required compression characteristics and packetisation requirements for the communication. If an appropriate channel is not available, the error can be signaled via the API. The message manager 60 determines, step 307, whether a multicast session is already established with the remote second system 102 and, if so, the destination address of the second system 102 is added to a multicast list associated with the multicast session. If no multicast session is already established, the message manager 60 determines, step 308, whether the audio communication should be unicast or multicast, according, for example, to a history of previous audio communications from this source to other destinations, or according to other rules provided by the API. Normally a multicast session is established, step 309, and an address list set up and a multicast address for second system 102 is added, step 310, to the multicast address list. The address of the multicast host is then sent to the second system 102 via the IP interface 20 and the second system 102 is enabled to listen to the first system 101 on the host multicast address site and is thereby allowed to receive audio from the first system 101. The first system 101 is thereby able to send, step 312, an audio signal to the second system 102.

Audio signals may be input from a microphone 90 or from alternative audio inputs 91, through appropriate filtering and analogue to digital conversion by the audio input and output module 50 and presented as input to the digital audio mixing module 40. Input conditioning in the form of limiting or compressing is selectable to ensure that the maximum audio level, once analogue to digital conversion has taken place, does not exceed a maximum coding range of the digital transmission system.

Figure 5:
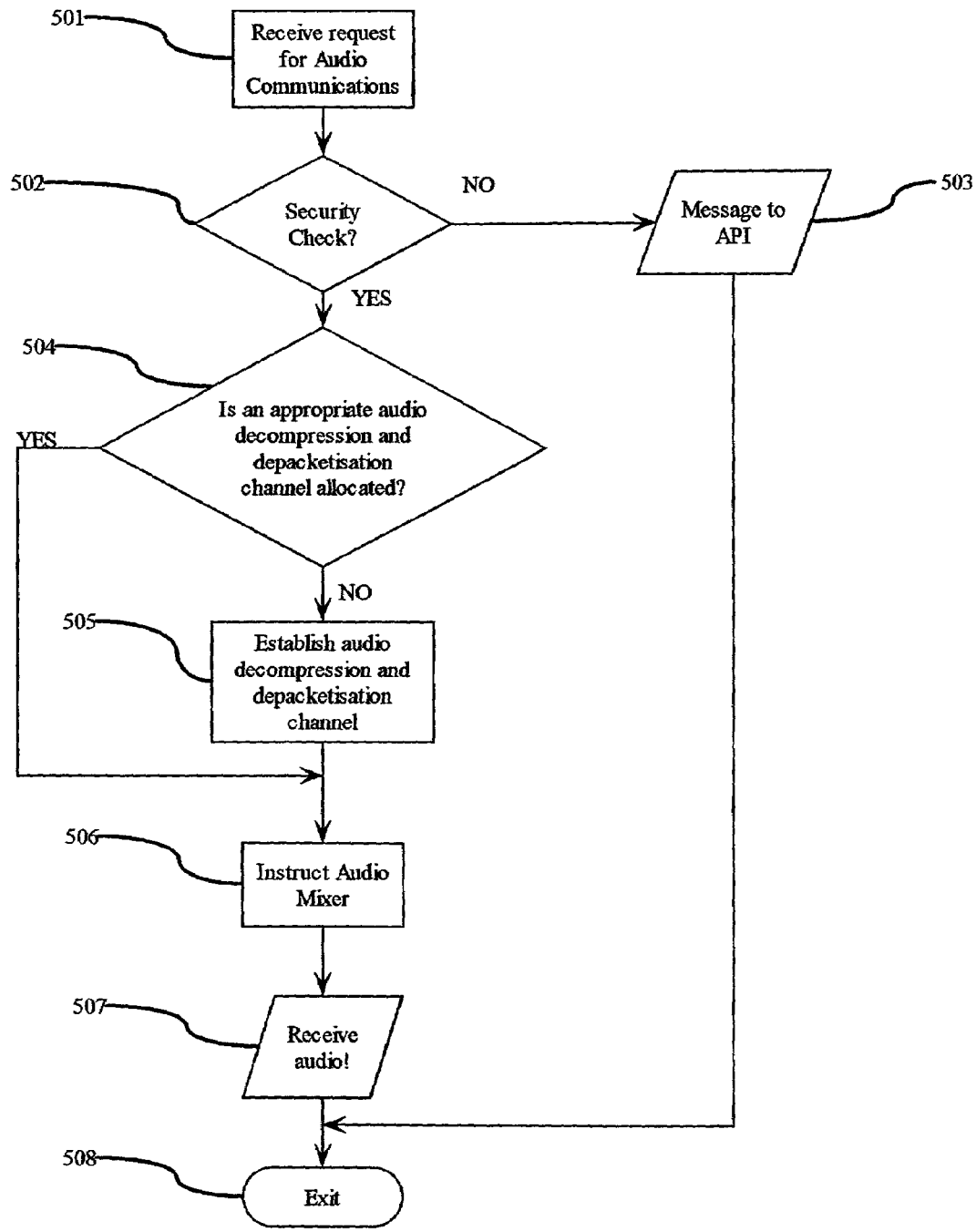
FIG. 5 is a flowchart according to another aspect of the invention showing the method of handling requests to receive audio communications.

As shown in FIG. 5, the second system 102 will perform similar steps to receive the audio signal. A request to accept audio communication is received, step 501, and security checks carried out, step 502, to determine whether communication with the first system 101 is permitted. If not, a message is sent, step 503, to the API. Otherwise, the corresponding audio channel manager module of the second system 102 allocates, step 505, a decompression and de-packetisation channel in its signal processing module and the audio channel manager takes the audio signal from this channel and presents, step 506, the audio signal to the audio mixer of the second system 102, which outputs signals to its output audio devices. The API can be used to instruct the audio mixer to set the received level at a required value and to route the audio to any available audio outputs. Thus, a unidirectional audio route may be set up from the first system 101 to the second system 102. The second system 102 can chose to stop listening at any time to the first system 101 without involving the first system 101. The second system 102 may stop listening temporarily by instruction to the audio mixer or permanently by de-allocating the decompression and de-packetisation channel in its signal processor module as instructed via the API. Unicast messages between the two systems may be used to de-allocate channels as required and send status information via the APIs.

In order for the second system 102 to initiate audio transmission back to the first system 101, a duplicate, but independent, process occurs in reverse, and therefore, there is no inherent requirement in the present invention for audio to be transferred bi-directionally, in contrast to standard telephony of the prior art, which utilises bidirectional (duplex) communications by default.

The First System 101 Initiates Audio Transmission to the Third System 103

Figure 4A:
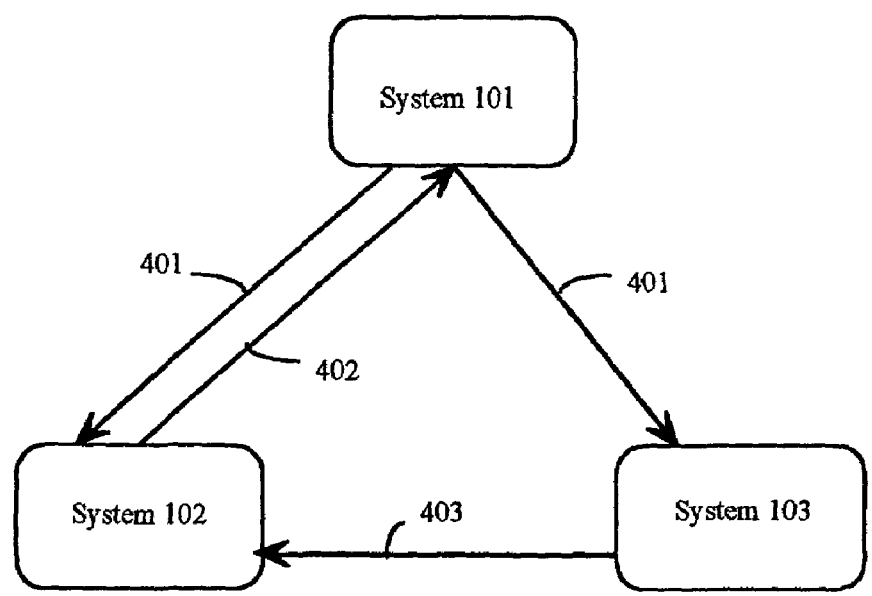
FIGS. 4A & 4B are block diagrams illustrating audio paths established during communications using the system and method of the invention.

Referring to FIG. 4A, if the first system 101 wishes to communicate with a third system 103 at the same time as communicating with the second system 102, an identical process to that used in establishing communications with the second system 102 takes place. However, in this case an audio communication session already exists from the first system 101 to the second system 102.

Again, referring to FIG. 3, audio communications is requested, step 301. Security and authentication checks are made, step 302. If such checks fail, a message can be sent via the API, step 303, and the system exited, step 313. Otherwise a check is made, step 304, to see whether an audio compression and packetisation channel pre-exists. If not, such a channel is established, steps 305 and 306, including negotiation with the remote third system 103; then, or if a channel does already exist, a check on the pre-existence of a suitable multicast session is made, step 307.

If a suitable multicast session exists, the required destination address is added, step 310, to its multicast list; suitable unicast messaging takes place to the destination to inform the third system 103 that audio will be transmitted on the chosen multicast address and that the third system 103 should now listen to the multicast from this address.

If not, a decision on unicast or multicast audio transmission is made, step 308. If, as might occur in this example, a unicast transmission is currently established, the first system 101 is communicating with the second system 102, this transmission may be terminated and replaced by a new multicast session, or a second unicast session established. The multicast or new unicast session are then established as appropriate, step 309 or 311, respectively. Finally audio transmission can take place, step 312.

The Third System 103 Initiates Audio Transmission to The Second System 102

The third system 103 may for example also communicate with the second system 102 using the same method.

Complete 3-Way Conference

If the steps above have been executed, all three parties are in audio communication as depicted in FIG. 4A and at this time there will be three sessions in existence:

A first session 401 initiated by the first system 101 to send audio to second and third systems 102 and 103, A second session 402 initiated by the second system 102 to send audio to the first system 101, A third session 403 initiated by the third system 103 to send audio to the second system 102.

The Third System 103 Initiates Audio Transmission to the First System 101

Figure 4B:
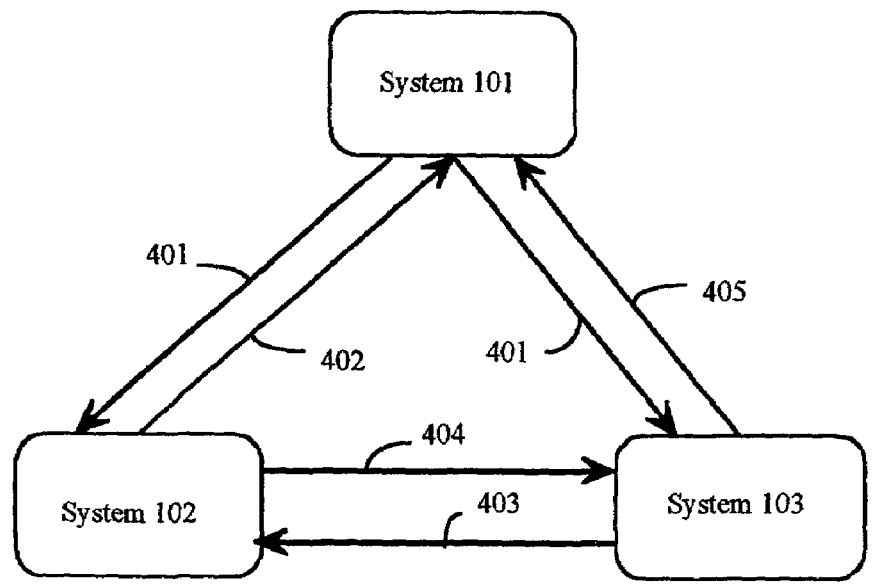

It is possible to complete a full multi-party conference and allow all parties to communicate bi-directionally, as illustrated in FIG. 4B by adding a fourth session 404 from the second system 102 to the third system 103 and a fifth session 405 from the third system 103 to the first system 101. It is a function of the controlling application to do this so it can be arranged for automatic reverse routes to be made, or for manual reverse routes as required.

The method as described above and illustrated in the flowchart of FIG. 3 is used by the third system 103 and the multicast audio transmission session managed by the third system 103 extended to include the first system 101 as a destination. The negotiation with the first system 101 results in the first system 101 allocating, step 305, anew de-packetisation and decompression channel.

The flowchart of FIG. 5 again illustrates the process in respect of the reception of audio signals by the first system 101, which is the same as that described above for the receipt of audio signals by the second system 102.

The third system 103 is in full control of received audio levels and may join or leave the conference as required by the controlling application, not the initiating system.

The audio mix at the first system output has no component resulting from local mixing of the first system's own audio input, nor any component resulting from mixing at the remote second and/or third system(s). Audio thereby received is a clean "mix-minus"—a full mix of audio contributors, minus the local source audio.

The audio communication paths resulting if all three exemplary systems establish bidirectional communications (i.e. a full duplex three-way conference) is depicted in FIG. 4B.

Additional Flexibility and Functions

Flexibility exists in the system architecture to allow systems to communicate with others using different compression/decompression and/or packetisation parameters. The signal processing module 30 can be instructed, if required, to perform this function. In this mode, a different multicast list would be set up for each audio channel requiring different parameters. Messages may be sent to listening systems to broadcast the availability of this audio using different encoding parameters.

I claim:

1. A system for managing Internet Protocol of at least one of unicast and multicast communications over a network, the system comprising: network interface means for interfacing between the network and other parts of the system; signal processing means connected to the network interface means having at least one audio channel for decompressing and de-packetising audio signals received from a plurality of remote systems through the network interface means and for outputting the audio signals to audio mixer means for mixing the received audio signals at different respective audio levels relative to the respective remote systems such that a resultant audio mix has no component resulting from local mixing of the system's own audio input, nor any component resulting from mixing at the respective remote systems so that the audio mix is a full mix of audio signals from the remote systems mixed by the system with no local source audio and having at least one audio channel for compressing and packetising audio signals received from the audio mixer means mixed at different respective audio levels for transmission through the network interface means over the network; audio channel manager means connected to the signal processing means for dynamically allocating the audio channels in the signal processing means and connected to the audio mixing means for signalling an allocated channel to the audio mixing means; and message manager means connected to the network interface means and to the audio channel manager means for managing the at least one of unicast and multicast communication of the audio signals.

2. A system as claimed in claim 1 wherein there is provided system controller means connected to the message manager means and the audio channel manager means for configuring and controlling the message manager means and the audio channel manager means, autonomously and independently of the remote systems.

3. A system as claimed in claims 1 wherein there is provided application program interface means connected to the system controller means for interfacing between the system controller means and an application program.

4. A system as claimed in claim 1 wherein there is provided audio input and output interface means for interfacing between the audio mixer means and audio inputs and outputs.

5. A system as claimed in claim 4 wherein the audio input and output interface means comprise at least one of audio limiting and compression means.

6. A system as claimed in claim 1 wherein the message manager means includes means for determining which remote systems may join and leave a communication session thereby preventing one of unauthorised monitoring of, and unauthorised contributions to, the communication session.

7. A method for managing Internet Protocol transmission of at least one of unicast and multicast communications over a network to a remote system, comprising the steps of: a) receiving an audio transmission request at audio channel manager means to transmit an audio signal over the network to a remote location; b) the audio channel manager means communicating with signal processing means to determine whether an appropriate audio compression and packetisation channel is allocated within the signal processing means and if not establishing such a channel and instructing an audio mixer connected to the signal processing means thereof; c) message manager means connected to the audio channel manager means determining whether an existing multicast session is established with the remote system and if it is established adding the address of the remote system to an address list of the existing multicast session but if it is not established determining whether to establish a new multicast session or a unicast session as appropriate with the remote location and if so establishing the new multicast session and adding the address of the remote location to an address list of the new multicast session or establishing the unicast session; d) using the signal processing means to compress and packetise the audio signal; and e) transmitting the compressed and packetised audio signal over the network to the remote system; such that an audio mix at the remote system has no component resulting from local mixing of the remote system's own audio input, nor any component resulting from mixing at other systems so that the audio mix is a full mix of audio signals from systems mixed by the remote system with no local source audio.

8. A method as claimed in claim 7 wherein step a) of receiving an audio request at audio manager means includes the steps of providing system controller means connected to the message manager means and to the audio channel manager means and providing an application program interface between the system controller and an application program, and receiving the audio transmission request at the application program interface and passing the request through the system controller means to the audio channel manager means.

9. A method as claimed in claim 7 wherein step d) of using the signal processing means to compress and packetise the audio signal further comprises the steps of providing audio input and output means connected to the audio mixing means and receiving an audio signal at the audio input and output means, limiting the audio signal and passing the signal to the audio mixing means for mixing the audio signal with other audio signals and passing the mixed audio signals to the signal processing means.

10. A method as claimed in claim 7 wherein step e) of transmitting the compressed and packetised audio signal, further comprises the steps of passing a compressed and packetised audio signal from the signal processing means to an IP interface means for transmission over the network.

11. A method as claimed in claim 7 including a further step, after receipt of the audio transmission request, of autonomously determining whether communication with the remote system is permitted according to predetermined rules and either allowing or aborting the audio transmission request accordingly.

12. A method as claimed in claim 7 wherein step d) of using the signal processing means to compress and packetise the audio signal further comprises the steps of providing audio input and output means connected to the audio mixing means and receiving an audio signal at the audio input and output means, compressing the audio signal, and passing the signal to the audio mixing means for mixing the audio signal with other audio signals and passing the mixed audio signals to the signal processing means.

13. A method for managing reception of at least one of unicast and multicast communications over a network from a plurality of remote systems, comprising the steps of: a) receiving an audio reception request at audio channel manager means to receive one or more audio signals over the network from a remote system; b) the audio channel manager means communicating with signal processing means to determine whether an appropriate audio de-compression and de-packetisation channel is allocated within the signal processing means and if such a channel is not established, establishing the channel; c) the audio channel manager means notifying an audio mixer of the allocated channel; d) receiving the audio signal at the signal processing means; e) the signal processing means decompressing and de-packetising the received audio signal in the allocated channel and outputting the decompressed and de-packetised audio signal to the audio mixing means; and f) the audio mixing means mixing the received signal with other received audio signals from the plurality of remote systems and outputting the mixed audio signals to audio outputs connected to the audio mixing means; such that a resultant audio mix has no component resulting from local mixing of the system's own audio input, nor any component resulting from mixing at the respective remote systems so that the audio mix is a full mix of audio signals from the remote systems mixed by the system with no local source audio.

14. A method as claimed in claim 13 wherein the step of receiving an audio reception request at audio manager means comprises the further steps of receiving an audio reception request over the network at IP interface means, passing the request to the message manager means and the message manager means passing the request to the audio channel manager means.

15. A method as claimed in claim 13 wherein step d) of receiving the audio signal comprises receiving the audio signal at the IP interface means and passing the audio signal to the audio signal processing means.

16. A method as claimed in any of claim 12 wherein there is provided a further step of providing system controller means for controlling the message manager means and for controlling the audio channel manager means, the system controller means interfacing with an application program through application program interface means connected to the system controller means, operating independently of remote systems.

17. A method as claimed in any of claim 12 wherein there is provided a further step, after receipt of the audio reception request, of determining whether communication with the remote system is permitted according to predetermined rules and either allowing or aborting the audio reception request accordingly.

* * * * *